(12) United States Patent
Kaneda et al.

(10) Patent No.: US 10,761,620 B2
(45) Date of Patent: Sep. 1, 2020

(54) ELECTRONIC PEN

(71) Applicant: Wacom Co., Ltd., Saitama (JP)

(72) Inventors: Takenori Kaneda, Tochigi (JP);
Kenichi Ninomiya, Kanagawa (JP);
Kohei Tanaka, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 169 days.

(21) Appl. No.: 16/028,333

(22) Filed: Jul. 5, 2018

(65) Prior Publication Data

US 2018/0314351 A1 Nov. 1, 2018

Related U.S. Application Data

(63) Continuation of application No. PCT/JP2016/085842, filed on Dec. 2, 2016.

(30) Foreign Application Priority Data

Feb. 5, 2016 (JP) .................................. 2016-021171

(51) Int. Cl.
*G06F 3/0354* (2013.01)
*B43K 29/08* (2006.01)
(Continued)

(52) U.S. Cl.
CPC ............ *G06F 3/03545* (2013.01); *B43K 7/02* (2013.01); *B43K 24/163* (2013.01); *B43K 29/08* (2013.01);
(Continued)

(58) Field of Classification Search
CPC ............ G06F 3/03545; G06F 3/03546; G06F 3/0416; G06F 3/044; G06F 3/041;
(Continued)

(56) References Cited

U.S. PATENT DOCUMENTS 4,651,161 A * 3/1987 Rich .......................... B41J 2/17
347/6
5,633,471 A * 5/1997 Fukushima ............... G01L 1/20
178/19.04
(Continued)

FOREIGN PATENT DOCUMENTS

JP H05275283 A 10/1993
JP H08194574 A 7/1996
(Continued)

*Primary Examiner* — Fred Tzeng
(74) *Attorney, Agent, or Firm* — Seed IP Law Group LLP

(57) ABSTRACT

An electronic pen includes an ink writing section including a core body and an ink holding section configured to hold an ink that is supplied to the core body, a circuit board, a transmission section which, in operation, transmits a signal, a connection member including a first side that holds an end portion of the ink writing section, on a side of the ink writing section opposite to the core body, and a second side that holds a first end portion of the circuit board, a pen pressure detector provided adjacent to a second end portion of the circuit board, and a casing configured to accommodate the ink writing section, the connection member, the circuit board and the pen pressure detector such that a tip portion of the core body protrudes from the casing.

9 Claims, 9 Drawing Sheets

(51) Int. Cl.
- *B43K 7/02* (2006.01)
- *G06F 3/046* (2006.01)
- *G06F 3/038* (2013.01)
- *B43K 24/16* (2006.01)
- *G06F 3/044* (2006.01)
- *G06F 3/0487* (2013.01)

(52) U.S. Cl.
CPC ............ *G06F 3/038* (2013.01); *G06F 3/0383* (2013.01); *G06F 3/03546* (2013.01); *G06F 3/044* (2013.01); *G06F 3/046* (2013.01); *G06F 3/0487* (2013.01)

(58) Field of Classification Search
CPC ........ G06F 3/038; G06F 3/046; G06F 3/0383; G06F 3/0487; G06F 3/0312
USPC .......................................................... 345/179
See application file for complete search history.

(56) References Cited

U.S. PATENT DOCUMENTS

| | | | | |
|---|---|---|---|---|
| 9,335,840 | B1 * | 5/2016 | Chou | G06F 3/0383 |
| 9,575,572 | B2 * | 2/2017 | Park | G06F 3/041 |
| 9,766,723 | B2 * | 9/2017 | Hicks | G06F 3/03545 |
| 9,785,259 | B2 * | 10/2017 | Cueto | G06F 3/0383 |
| 9,864,452 | B2 * | 1/2018 | Kim | G06F 3/0416 |
| 9,891,722 | B2 * | 2/2018 | Hicks | G06F 3/03545 |
| 9,946,365 | B2 * | 4/2018 | Cueto | G06F 3/03545 |
| 10,234,962 | B2 * | 3/2019 | Obata | G06F 3/03545 |
| 10,240,990 | B2 * | 3/2019 | Obata | G06F 3/046 |
| 10,466,862 | B2 * | 11/2019 | Kim | G06F 3/0362 |
| 10,474,253 | B2 * | 11/2019 | Kamiyama | G06F 3/03545 |
| 2004/0125089 | A1 * | 7/2004 | Chao | G06F 3/03545 345/179 |
| 2005/0057534 | A1 * | 3/2005 | Charlier | G06F 3/0312 345/179 |
| 2009/0251442 | A1 * | 10/2009 | Nakata | G06F 3/03545 345/179 |
| 2014/0069532 | A1 * | 3/2014 | Obata | G06F 3/046 137/554 |
| 2015/0124178 | A1 * | 5/2015 | Khan | G02F 1/13338 349/12 |

FOREIGN PATENT DOCUMENTS

| | | |
|---|---|---|
| JP | 2014067265 A | 4/2014 |
| WO | 2015007856 A1 | 1/2015 |

* cited by examiner

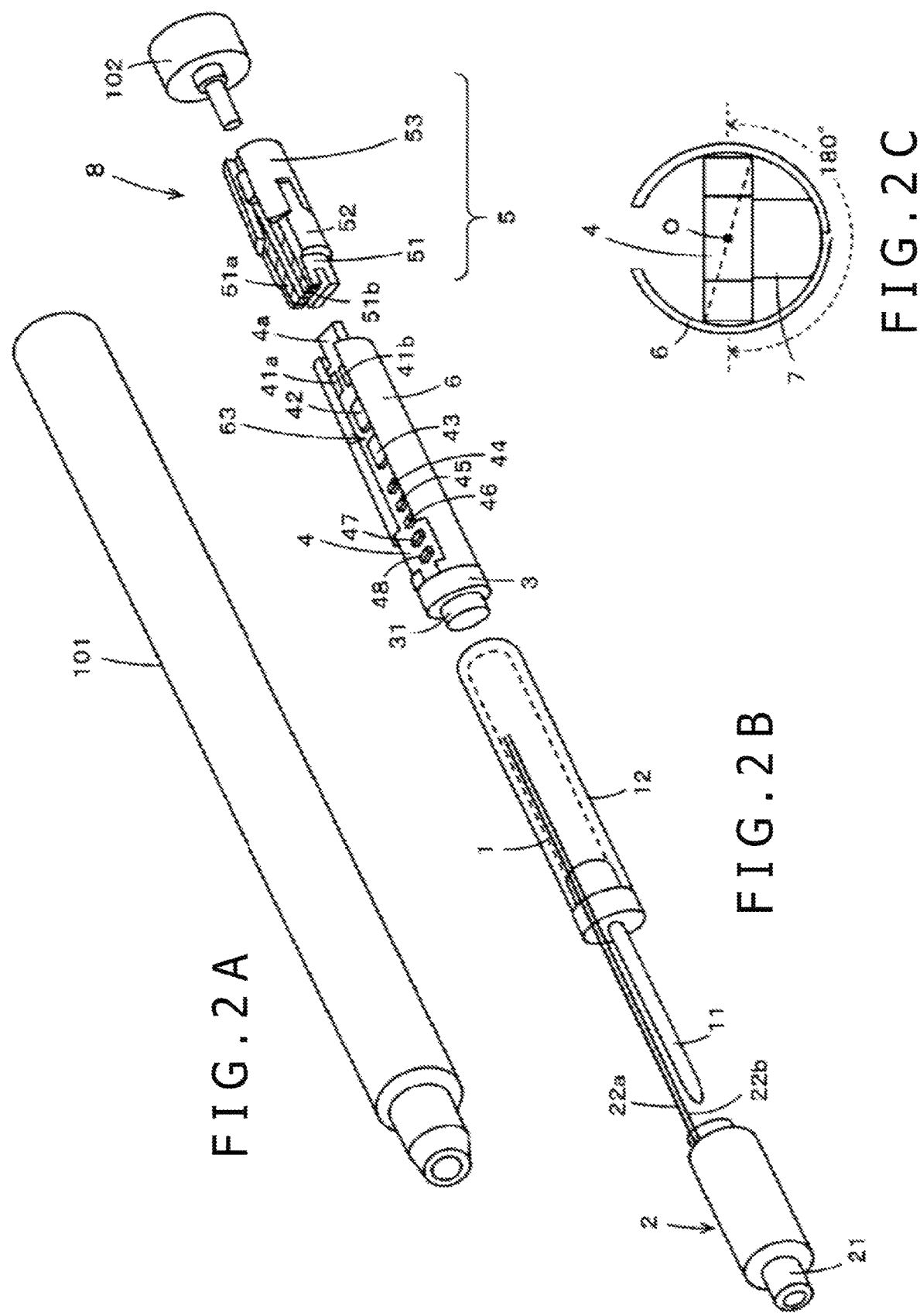

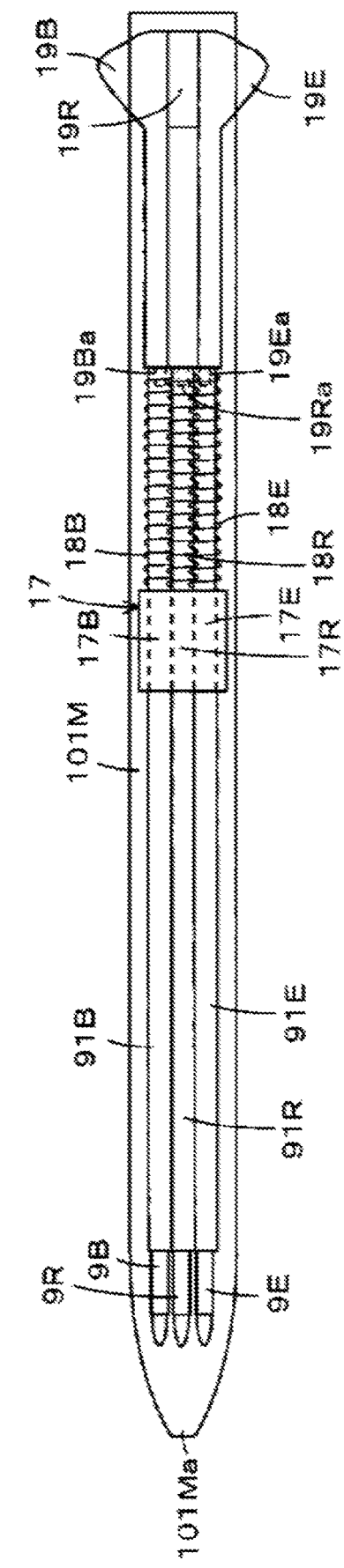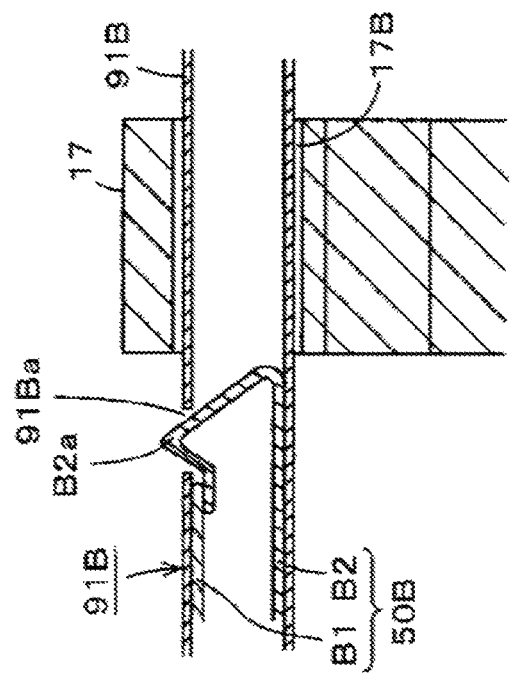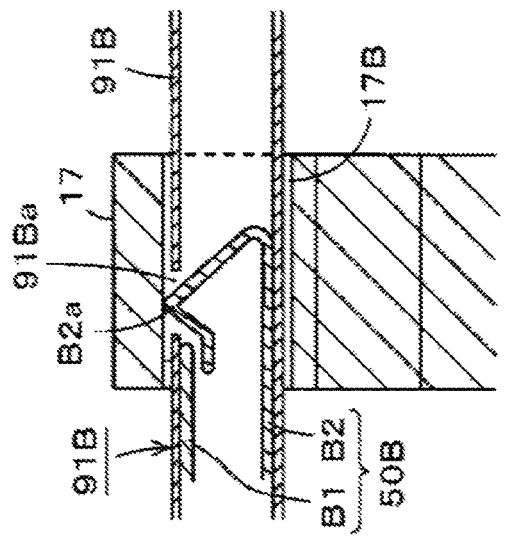

ELECTRONIC PEN

BACKGROUND

Technical Field

The present disclosure relates to an electronic pen which is a pen-type position indicator for use with a position detecting device.

Description of the Related Art

An electronic pen is grasped by a user, and is used to indicate a position on a sensor of a position detecting device. The indicated position on the sensor by the electronic pen is detected by the position detecting device, through transfer of a position detection signal between the electronic pen and the sensor by one of various coupling systems such as an electromagnetic induction coupling system and a capacitive coupling system. In addition, there is an electronic pen which can detect a pen pressure (writing pressure) exerted by the user at the time of writing and can inform the position detecting device of the detected pen pressure. In this case, also, fine information inputting while taking the pen pressure into account can be realized. Besides, the detection of the pen pressure conducted with the electronic pen is performed using a variable capacitor, for example.

As the variable capacitor for use to detect the pen pressure by the electronic pen, there is, for example, one as depicted in FIG. 10. The variable capacitor includes a dielectric 501, a first electrode 502, a second electrode 503, a spacer 504, and an elastic body 505 which are provided inside a housing 506, with a pressing body 507 provided for pressing the elastic body 505. Terminals 508 and 509 are output terminals of the variable capacitor. The housing 506 includes a first housing member 561 and a second housing member 562 inserted thereinto from the lower side. In addition, the pressing body 507 includes a core body 571 and a cap body 572.

As depicted in FIG. 10, the first electrode 502 and the second electrode 503 are disposed inside the housing 506, with the dielectric 501 and the spacer 504 sandwiched therebetween, whereby a capacitor is formed. In this case, the second electrode 503 faces that surface of the dielectric 501 which is on the pressing body 507 side, with the spacer 504 interposed therebetween. According to a pressing force (pen pressure) exerted through the pressing body 507, therefore, the contact area between the surface, on the pressing body 507 side, of the dielectric 501 and the second electrode 503 is varied, whereby the capacitance of the capacitor is varied. Based on the variation in the capacitance, the pen pressure can be detected. Note that an electronic pen using such a variable capacitor is described in detail in, for example, Japanese Patent Laid-open No. 1993-275283.

In recent years, as one of modes for using an electronic pen, there has been practiced an operation of writing calligraphy (characters or figures) in an ink or inks on, for example, a paper medium set on a position detecting device, recognizing and taking in the electronic data corresponding to the calligraphy on the paper medium or the like through the position detecting device, and holding the electronic data. When the electronic data corresponding to the calligraphy formed on the paper medium or the like is left, duplication, edition and the like of the calligraphy can be easily performed, which is convenient. In this case, conventionally, as described using FIG. 10, the core body 571 of the electronic pen formed together with the variable capacitor for pen pressure detection is replaced by an ink refill of a ball-point pen. Specifically, by replacing a core body of an electronic pen module with a refill of a ball-point pen, it is possible to realize both a function as a ball-point pen and a function as an electronic pen.

However, since the variable capacitor for pen pressure detection is pressed by the core body as described referring to FIG. 10 above, the variable capacitor would be larger than the core body in diameter. For this reason, there are considerable limitations as to the outside diameter and design of electronic pens, which makes it difficult to obtain a design preferred by users. Especially, it is difficult to reduce the electronic pen in thickness (diametric size). If an electronic pen can be reduced in thickness (diametric size), it is convenient to carry the electronic pen together with a portable information terminal such as a tablet PC (Personal Computer). In addition, if the electronic pen can be reduced in thickness (diametric size) to a value comparable to that of a refill of a ball-point pen, it is possible to accommodate the electronic pen of a refill shape in a casing (case) of a ball-point pen being used ordinarily, and thereby to easily realize an electronic pen convenient to use.

BRIEF SUMMARY

Thus, there is a need for an electronic pen which has both a function of recording on a paper medium or the like and a function of an electronic pen and in which a reduction in thickness (diametric size) is realized.

In accordance with the present disclosure, there is provided an electronic pen including: an ink writing section including a core body and an ink holding section configured to hold an ink that is supplied to the core body; a circuit board; a transmission section which, in operation, transmits a signal; a connection member including a first side that holds an end portion of the ink writing section, on a side of the ink writing section opposite to the core body, the connection member also including a second side that holds a first end portion of the circuit board; a pen pressure detector provided adjacent to a second end portion of the circuit board; a casing configured to accommodate the ink writing section, the connection member, the circuit board and the pen pressure detector, wherein a tip portion of the core body protrudes from the casing, wherein the transmission section is fixed to the core body, wherein the transmission section is disposed closer to the core body than the ink holding section, wherein the ink holding section is disposed between the transmission section and the circuit board, and wherein at least the ink writing section, the connection member and the circuit board move according to a pen pressure exerted on the core body.

According to the electronic pen as above, the transmission section, the ink writing section, the connection member, the circuit board and the pen pressure detector are accommodated in the casing to constitute the electronic pen. The ink writing section includes the core body and the ink holding section, and corresponds, for example, to a refill of a ball-point pen or the like. In addition, the transmission section is disposed on a side of the ink writing section that includes the core body, the end, on a side opposite to the core body, of the ink writing section is held on one side of the connection member, and one end of the circuit board is held on the other side of the connection member. By this, at least the ink writing section, the connection member and the circuit board are connected in series and integrally with one another. Besides, the pen pressure detector is provided on the side of the end, opposite to the side of connection with the connection member, of the circuit board. In addition, the ink writing section, the connection member and the circuit board integrated with one another is moved, as one body, according to the pen pressure exerted on the core body.

Thus, a configuration in which the ink writing section integrated with the core body directly presses the pen pressure detector is not adopted. Unlike in the case of the conventional electronic pen, therefore, it is unnecessary to make the pen pressure detector so large as to correspond to the outside diameter of the ink writing section integrated with the core body. Therefore, a reduction in the thickness (diametric size) of the electronic pen can be realized. In addition, the pen pressure detector can be provided on the side of the end, opposite to the side of connection with the connection member, of the circuit board. Besides, with the ink writing section, the connection member and the circuit board connected in series and integrally, the pen pressure exerted on the core body of the ink writing section can be suitably transmitted to the pen pressure detector.

According to the present disclosure, it is possible to realize an electronic pen which has both a function of recording on a paper medium or the like and a function of an electronic pen and in which a reduction in thickness (diametric size) is realized.

BRIEF DESCRIPTION OF THE DRAWINGS

FIG. 2B is an exploded perspective view for explaining the inside configuration and the like of the embodiment of the electronic pen according to the present disclosure, and FIGS. 2A and 2C are related figures;

FIGS. 6A to 6C are figures for explaining an example in which the electronic pen cartridge is utilized in a casing of a multicolor ball-point pen;

DETAILED DESCRIPTION

Figure 1:
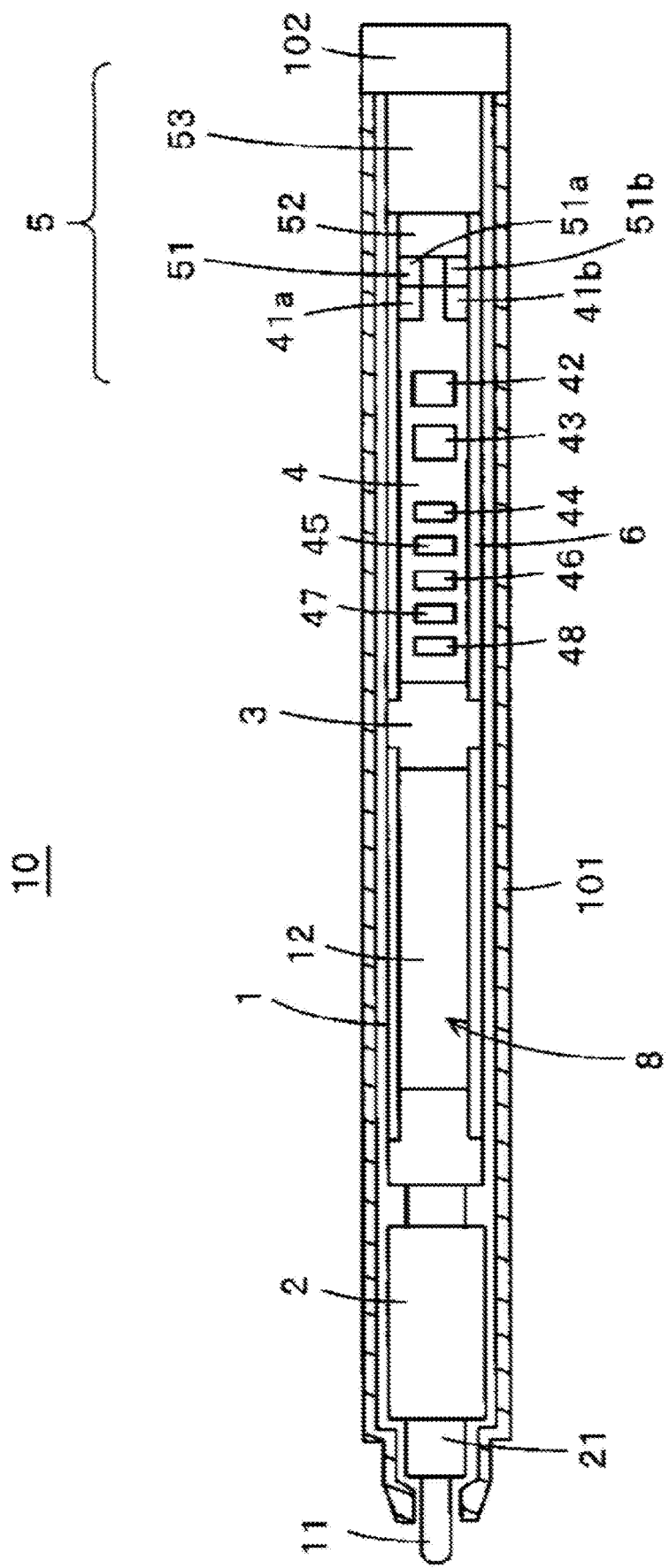
FIG. 1 is a figure for explaining the general outline of an embodiment of an electronic pen according to the present disclosure.

An embodiment of an electronic pen according to the present disclosure will be described below, referring to the drawings. First, an embodiment in which the present disclosure is applied to an electronic pen of an electromagnetic induction system will be described.

[Configuration of Electronic Pen]

FIG. 1 is a figure for explaining a configuration example of an electronic pen 10 according to an embodiment of the present disclosure, specifically, for explaining a general outline of the electronic pen 10 according to the present embodiment. In FIG. 1, a casing (case) 101 of the electronic pen 10 of the present embodiment is cut, and the inside thereof is illustrated.

The electronic pen 10 of the present embodiment has a configuration in which an electronic pen main body section 8 is accommodated in the casing 101, and the rear end side of the casing 101 is closed with a casing cap 102. As depicted in FIG. 1, the electronic pen main body section 8 is a section which includes an ink writing section 1 having a core body 11 and an ink holding section 12 integrated with each other, a coil section 2 provided around the core body 11 of the ink writing section 1, a connection member 3, and a circuit board 4, with a board protecting pipe (rigid tubular member) 6 being provided around the circuit board 4, and, further, with a pen pressure detector 5 being provided at an end portion, on the side opposite to the connection member 3 side, of the circuit board 4.

FIG. 2B is an exploded perspective view for mainly explaining the configuration of the electronic pen main body section 8. As aforementioned, the electronic pen 10 of the present embodiment has a configuration in which the electronic pen main body section 8 is accommodated in the casing 101 depicted in FIG. 2A, and the rear end side of the casing 101 is closed with the casing cap 102 depicted in FIG. 2B.

As depicted in FIG. 2B, the electronic pen main body section 8 includes the ink writing section 1, which includes the core body 11 and the ink holding section 12. The ink writing section 1 supplies an ink held in the ink holding section 12 to the core body 11, and leads the ink to a tip of the core body 11 in such a manner that calligraphy (characters or figures) in the ink can be written on a paper medium or the like brought into contact with the tip of the core body 11. In other words, the ink writing section 1 corresponds to a refill of a ball-point pen. Note that an end portion, on the side opposite to the core body 11, of the ink holding section 12 has an opening.

As depicted in FIG. 2B, the coil section 2 is provided around the core body 11 of the ink writing section 1. The coil section 2 is formed by winding an insulated wire (coated conductor) around a hollow cylindrical ferrite 21. In the present embodiment, as depicted in FIG. 2B, ferrite portions without the coated conductor wound therearound are provided at both sides in regard of the axial direction of the coil section 2, but these portions may not necessarily be provided.

Extension wires 22a and 22b from both respective ends of the coil 22 formed by winding the coated conductor around the ferrite 21 of the coil section 2 are connected to an electronic circuit formed on the circuit board 4 which will be described later. In addition, the coil section 2 constitutes a resonance circuit together with a capacitor (capacitor element) and the like of the electronic circuit formed on the circuit board 4, in such a manner that transfer of signals between the electronic pen 10 and a position detecting device can be performed through the resonance circuit.

The connection member 3 interconnects the ink writing section 1 and the circuit board 4. That portion of the connection member 3 which is on the ink writing section 1 side (one end portion) is a first holding section 31 fitted to the opening at the end portion, on the side opposite to the core body 11 side, of the ink holding section 12 and holding the ink writing section 1. Besides, that portion of the connection member 3 which is on the circuit board 4 side (the other end portion) is a second holding section 32 which holds the circuit board 4 (described later) in the manner of sandwiching the circuit board 4. In addition, the second holding section 32 (not depicted in FIG. 2B) of the connection member 3 is also a section which is fitted to the board protecting pipe 6 (described later) accommodating the circuit board 4 and holds the board protecting pipe 6. Besides, the ink holding section 12 may be hermetically sealed by the connection member 3, and the inside of the ink holding section 12 may be pressurized.

The circuit board 4 is formed in a configuration in which terminals 41a and 41b and various electronic parts (circuit parts) are mounted on a rectangular insulating substrate provided with projections 4a and 4b at both end in the axial direction thereof, and wirings for connecting them are provided. Note that in FIG. 2B, the circuit board 4 is depicted in the state of being connected to the connection member 3, and the projection 4b provided on the connection member 3 side of the circuit board 4 is not seen. Besides, the various electronic parts mounted on the circuit board 4 to constitute an electronic circuit include an IC (Integrated Circuit) 42 functioning as a control circuit, a side switch 43, and capacitors 44 to 48.

In addition, the pen pressure detector 5 is connected to an end portion, on the side opposite to the connection member 3, of the circuit board 4. As depicted in FIGS. 1 and 2B, the pen pressure detector 5 is divided largely into a connection terminal section 51, a fitting section 52, and a pressure sensor 53.

As depicted in FIG. 2B, the connection terminal section 51 has upper and lower two plate portions connected to the fitting section 52, which will be described later. The plate portions sandwich the circuit board 4 therebetween. In this case, the spacing between the upper and lower two plate portions is slightly narrower than the thickness of the circuit board 4, such that the circuit board 4 can be clamped between the plate portions. One of the two plate portions, specifically, the upper-side plate portion in the present embodiment, is provided with terminals 51a and 51b to which signal wires from terminal members of the pressure sensor 53 (described later) are connected, as depicted in FIGS. 1 and 2B. The terminals 51a and 51b are formed in a roughly U shape such as to extend from an upper surface and through a side surface to reach a lower surface of the upper-side plate portion of the connection terminal section 51. By this structure, when the circuit board 4 is clamped by (connected with) the connection terminal section 51, the terminals 51a and 51b of the connection terminal section 51 and the terminals 41a and 41b of the circuit board 4 are automatically connected to each other.

The fitting section 52 is a section to be fitted to the board protecting pipe 6, which will be described later. The fitting section 52 is formed, for example, in a substantially cylindrical hollow shape from a resin or rigid rubber or the like, and is fitted firmly and integrally to the pressure sensor 53, which will be described later. Though not depicted, the fitting section 52 is provided on the inside thereof with a recess into which the projection 4a of the circuit board 4 is fitted. Note that the outside diameter of the fitting section 52 is slightly larger than the inside diameter of the board protecting pipe 6, such that the fitting section 52 can be firmly fitted to the board protecting pipe 6. In addition, a configuration is adopted such that when the board protecting pipe 6 is fitted to the fitting section 52, the outer circumference of the board protecting pipe 6 coincides with the outer circumference of the pressure sensor 53. Note that for easy fitting of the board protecting pipe 6, an end portion on the circuit board 4 side of the fitting section 52 is provided with an inclined portion where the outer circumference thereof is shorter than the inner circumference of the board protecting pipe 6.

The pressure sensor 53 is configured by mounting a pressure sensing part in a case formed in a cylindrical shape from a resin or the like, and the outer circumference and shape of an end face thereof agree substantially with the outer circumference and shape of the board protecting pipe 6.

The board protecting pipe 6 is a rigid tubular member which is formed by use of a metal, a carbon material, a synthetic resin or the like and is insusceptible to breaking or bending. Both ends of the board protecting pipe 6 are openings. The openings at both ends of the board protecting pipe 6 are openings in a direction intersecting the axial direction. The opening portion on the connection member 3 side of the board protecting pipe 6 constitutes a fitting portion for fitting to the connection member 3. In addition, the opening portion on the pen pressure detector 5 side of the board protecting pipe 6 constitutes a fitting portion for fitting to the fitting section 52 of the pen pressure detector 5.

Further, the board protecting pipe 6 has an opening (a side opening in a direction along the axial direction) 63 formed in the manner of cutting away a part of a side wall of the board protecting pipe 6 in such a manner to interconnect the openings (the openings in the direction intersecting the axis) at both ends in regard of the axial direction. The opening 63 permits an operation on the side switch provided on the circuit board 4 to be conducted therethrough in a state in which the circuit board 4 is accommodated in the board protecting pipe 6. In addition, the opening 63 permits laser cutting work for cutting unnecessary capacitor connection to be conducted therethrough, in order to adjust the capacitance of the capacitor (capacitor element) constituting the resonance circuit together with the coil section 2. Thus, the opening 63 is for enabling an operation or work on the circuit board 4 accommodated in the board protecting pipe 6 to be carried out therethrough.

Besides, the board protecting pipe 6 is configured such as to have a side wall over an angular range of not less than 180 degrees with the axis as a center, notwithstanding the opening 63 is provided. To be more specific, as depicted in FIG. 2C, the side wall of the board protecting pipe 6 is left in such a manner that when the circuit board 4 is accommodated in the board protecting pipe 6, both long edges of that surface of the circuit board 4 which faces the opening 63 make contact with the inner wall of the board protecting pipe 6. In other words, the width in the direction orthogonal to the axial direction of the opening 63 is shorter than the width in the direction intersecting the axial direction of that portion of the circuit board 4 which is other than the portions of the projections 4a and 4b.

More specifically, as illustrated in FIGS. 1 and 2B, the circuit board 4 is protected by being accommodated in the inside of the board protecting pipe 6. In this case, ideally, as depicted in FIG. 2C, the circuit board 4 is accommodated in the board protecting pipe 6 in such a manner that the axis O of the board protecting pipe 6 coincide substantially with the axis of the circuit board 4. In this case, ideally, the circuit board 4, exclusive of the portions of the projections 4a and 4b provided at both ends in regard of the axial direction thereof, is formed in such a manner that the diagonal of its section in the direction orthogonal to the axis thereof is equal to the inside diameter of the board protecting pipe 6.

However, for easy accommodation of the circuit board 4 into the board protecting pipe 6, the circuit board 4 is formed such that the diagonal of the section in the direction orthogonal to the axial direction, indicated by dotted line in FIG. 2C, is slightly shorter than the inside diameter of the board protecting pipe 6. In addition, as depicted in FIG. 2C, a trapezoidal board receiving base 7 such that the circuit board 4 is located at a somewhat upper position is fixed inside the board protecting pipe 6. Specifically, while the circuit board 4 is mounted on the board receiving base 7, the circuit board 4 is pushed slightly upward within the board protecting pipe 6, such that the circuit board 4 can be held by being clamped between the board receiving base 7 and the board protecting pipe 6.

In the electronic pen main body section 8 of the present embodiment, the core body 11 of the ink writing section 1 penetrates the tubular ferrite 21 of the coil section 2, whereby the coil section 2 can be provided around the core body 11. In addition, the opening of the ink holding section 12 of the ink writing section 1 and the first holding section 31 of the connection member 3 are fitted to each other, and the connection member 3 holds the ink writing section 1. Besides, the second holding section 32, on the side opposite to the ink writing section 1 side, of the connection member 3 clamps one end portion of the circuit board 4, thereby holding the circuit board 4.

Further, the board protecting pipe 6 accommodates the circuit board 4, and is fitted to the second holding section 32 of the connection member 3. In addition, the other end (the side where the terminals 41a and 41b are provided) of the circuit board 4 is clamped by the connection terminal section 51 of the pen pressure detector 5, and the projection 4a of the circuit board 4 is fitted into a recess inside the fitting section 52. Besides, the end portion, on the side opposite to the connection member 3, of the board protecting pipe 6 is fitted to the fitting section 52 of the pen pressure detector 5.

In this way, the coil section 2, the ink writing section 1, the connection member 3, the circuit board 4 and the board protecting pipe 6, and the pen pressure detector 5 are connected integrally, to constitute the electronic pen main body section 8. In this case, that portion of the coil section 2 around which the coated conductor is wound, the ink holding section 12 of the ink writing section 1, the other portion of the connection member 3 than the first and second holding sections 31 and 32, the board protecting pipe 6, and the portion of the pressure sensor 53 of the pen pressure detector 5 are substantially the same in outer circumference and in the shape of sectional surface in the direction intersecting the axis. By this, the electronic pen main body section 8 which has a side surface substantially free of ruggedness (projections and recesses) and is easy to accommodate in the casing 101 can be configured.

Note that since the opening 63 (side opening) in the direction along the axial direction of the board protecting pipe 6 is provided, an operation on the side switch provided on the circuit board 4 and a working on the electronic circuit formed on the circuit board 4 accommodated in the board protecting pipe 6 can be carried out. Moreover, as has been described using FIG. 2C, the opening 63 is formed in such a manner as to leave the side wall over an angular range of not less than 180 degrees with the axis as a center, and, therefore, the strength of the board protecting pipe 6 is prevented from being lowered, and the circuit board 4 can be protected adequately.

Figure 3A:
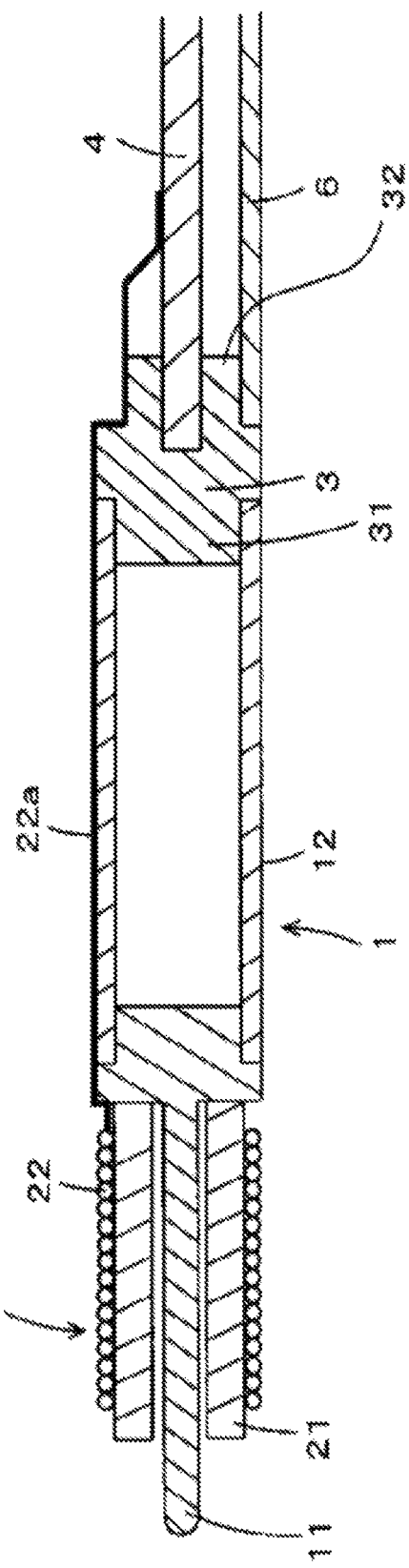
FIGS. 3A and 3B are sectional views for explaining a connection part including an ink writing section as a center and a connection part including a pen pressure detector as a center in the embodiment of the electronic pen according to the present disclosure.

A connection section including the ink writing section 1 as a center and a connection section including the pen pressure detector 5 as a center, of the electronic pen main body section 8 in the present embodiment, will be described below. FIG. 3A is a sectional view for explaining the connection section including the ink writing section 1 as a center of the electronic pen main body section 8 depicted in FIGS. 1 and 2B, and FIG. 3B is a sectional view for explaining the connection section including the pen pressure detector 5 as a center of the electronic pen main body section 8.

As depicted in FIG. 3A, the core body 11 of the ink writing section 1 penetrates the tubular ferrite 21 of the coil section 2, whereby the coil section 2 is provided around the core body 11. In addition, the first holding section 31 of the connection member 3 is fitted to the opening of the ink holding section 12 of the ink writing section 1, to hold the ink writing section 1. Besides, the second holding section 32 of the connection member 3 clamps the circuit board 4, to hold the circuit board 4. In addition, the board protecting pipe 6 is fitted to the second holding section 32 of the connection member 3 in the manner of enclosing the outside of the second holding section 32. In this case, the board protecting pipe 6 accommodates, and thereby protects, the circuit board 4 held by the second holding section 32 of the connection member 3. In this way, the coil section 2, the ink writing section 1, the connection member 3, the circuit board 4, and the board protecting pipe 6 are connected.

Figure 3B:
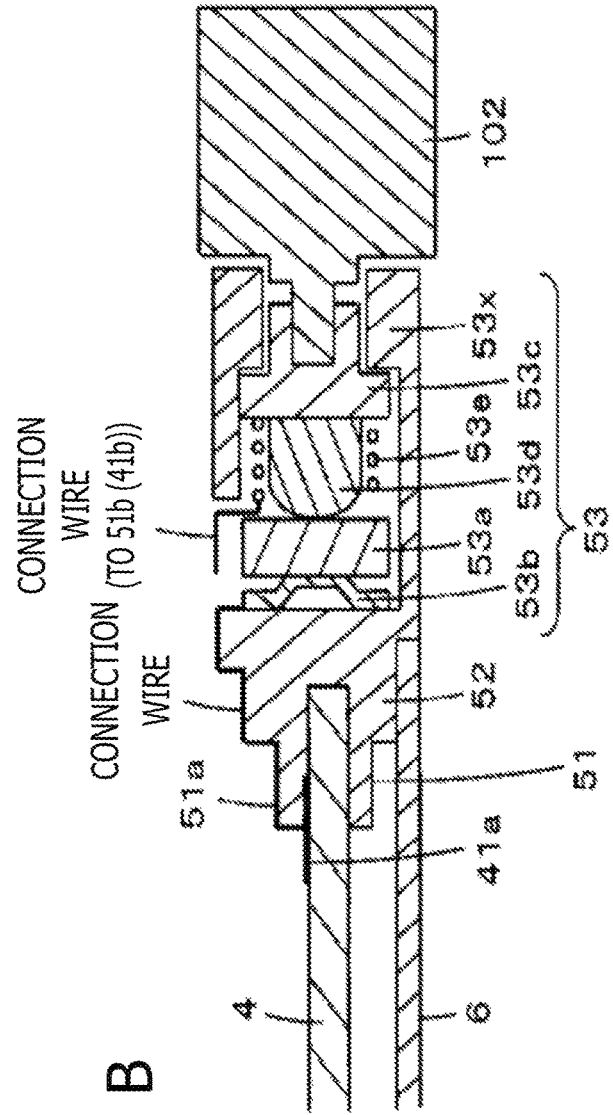

On the other hand, as depicted in FIG. 3B, the pressure sensor 53 of the pen pressure detector 5 is formed by providing pressure sensing parts in a resin mold 53x, for example. The pressure sensing parts mounted on the pressure sensor 53 are a plurality of parts including a dielectric 53a, a terminal member 53b, a holding member 53c, a conductive member 53d and an elastic member 53e, as depicted in FIG. 3B. The terminal member 53b is formed from a conductive material, and constitutes a first electrode of a variable capacitor which includes the pressure sensing parts. In addition, the conductive member 53d is formed from, for example, a conductive rubber, and the elastic member 53e includes a coil spring formed from a conductive material. The conductive member 53d and the elastic member 53e are electrically connected to each other, to constitute a second electrode of the variable capacitor.

In addition, as depicted in FIG. 3B, the circuit board 4 is clamped by the connection terminal section 51 of the pen pressure detector 5, and the projection 4b of the circuit board 4 is fitted into the recess inside the fitting section 52. By this, the circuit board 4 and the pen pressure detector 5 are connected together. Besides, an end portion, on the side opposite to the connection member 3, of the board protecting pipe 6 is fitted to the fitting section 52 of the pen pressure detector 5, thereby being held. As a result, the ink writing section 1, the connection member 3, the circuit board 4 and the pen pressure detector 5 are connected in series with one another. In addition, the board protecting pipe 6 accommodating the circuit board 4 connects the connection member 3 and the pen pressure detector 5, and, together with the circuit board 4, interconnects the connection member 3 and the pen pressure detector 5.

Further, the circuit board 4 and the connection terminal section 51 of the pen pressure detector 5 are connected to each other, whereby the terminal 41a provided on the circuit board 4 and the terminal 51a of the connection terminal section 51 are electrically connected, as aforementioned. Similarly, the terminal 41b provided on the circuit board 4 and the terminal 51b of the connection terminal section 51 are electrically connected. The terminals 41a and 41b on the circuit board 4 are connected to the electronic circuit formed on the circuit board 4. In addition, a connection wire from the first electrode composed of the terminal member 53b is connected to the terminal 51a of the connection terminal section 51, and a connection wire from the second electrode composed of the conductive member 53d and the elastic member 53e is connected to the terminal 51b of the connection terminal section 51. By this, an output signal from the pressure sensing parts of the pressure sensor 53 is supplied to the electronic circuit configured on the circuit board 4.

In addition, as depicted in FIG. 3B, the portion composed of the holding member 53c and the conductive member 53d is constantly biased, by the action of the elastic member 53e, in such a direction that the conductive member 53d is spaced away from the dielectric 53a. In other words, the dielectric 53a and the conductive member 53d can move toward and away from each other. As a result, in the electronic pen main body section 8 of the present embodiment, when a pen pressure is exerted on the core body 11, the portion composed of the ink writing section 1 and the connection member 3 and the circuit board 4 acts on the pen pressure detector 5.

In this case, as seen from FIG. 3B, the portion composed of the resin mold 53x, the terminal member 53b and the dielectric 53a approaches the portion composed of the conductive member 53d and the holding member 53c being biased in the spacing-away direction by the action of the elastic member 53e. By this, the capacitance of the pressure sensing parts configured to form the variable capacitor is varied, and an output signal according to the pen pressure is supplied to the electronic circuit on the circuit board 4. Consequently, the pen pressure can be detected in the electronic circuit formed on the circuit board 4.

In addition, as depicted in FIG. 3A, the extension wires 22a and 22b from both ends of the coil 22 of the coil section 2 are connected to the electronic circuit on the circuit board 4. By this, as aforementioned, the coil section 2 constitutes the resonance circuit together with the capacitor 44 and the like in the electronic circuit on the circuit board 4, and a signal according to the pen pressure can be transmitted from the coil section 2 to the position detecting device.

Note that in the present embodiment, the casing cap 102 is provided with a projection to be fitted into a recess of the holding member 53c provided in the pressure sensor 53. By this, the portion composed of the holding member 53c and the conductive member 53d is positionally restricted within the resin mold 53x, and can face the dielectric 53a at a fixed position.

[Outline of Coordinate Detection Sensor of Electromagnetic Resonance System]

Figure 4:
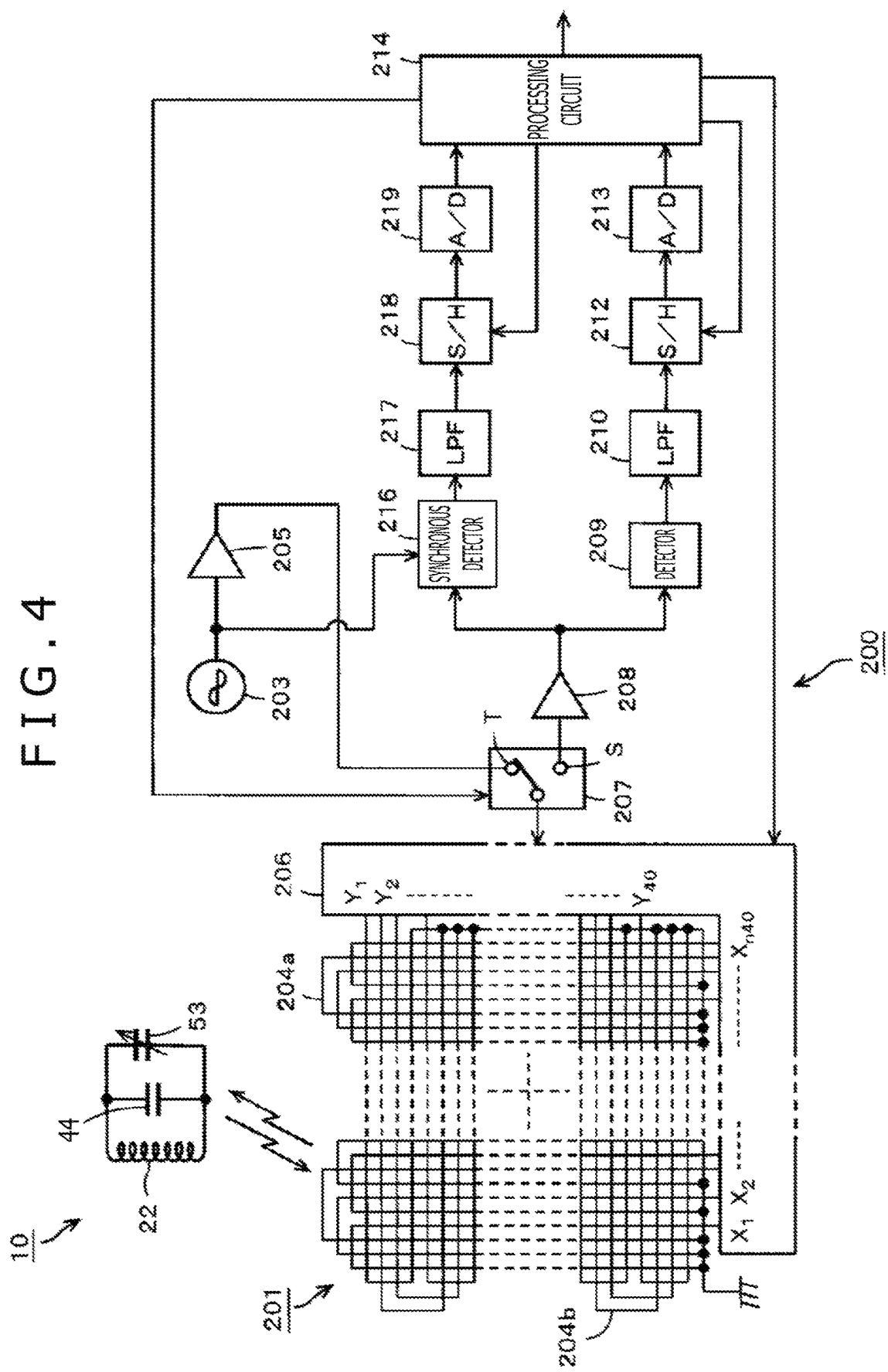
FIG. 4 is a block diagram depicting a circuit configuration example of an electronic pen and a position detecting device of the embodiment.

A circuit configuration example in a specific embodiment of a position detecting device 200 of an electromagnetic resonance system for detection of an indicated position and detection (sensing) of a pen pressure by use of the electronic pen 10 of the electromagnetic resonance system described referring to FIGS. 1 to 3B will be described below, referring to FIG. 4. FIG. 4 is a block diagram depicting a circuit configuration example of the electronic pen 10 and the position detecting device 200. The electronic pen 10 and the position detecting device 200 together constitute an input device.

On a circuit configuration basis, the electronic pen 10 is represented by a resonance circuit composed of a position indicating coil 22, the variable capacitor as a pressure sensing part in the pressure sensor 53 connected to the position indicating coil 22, a resonance capacitor 44 connected in parallel to the variable capacitor in the pressure sensor 53, and the like.

On the other hand, in the position detecting device 200, a coordinate detection sensor 201 of the electromagnetic induction system is formed by providing an X-axis direction loop coil group 204a and a Y-axis direction loop coil group 204b in a stacked manner. Each of the loop coil groups 204a and 204b includes, for example, 40 rectangular loop coils. The loop coils constituting each of the loop coil groups 204a and 204b are disposed in the manner of sequentially overlapping with one another at regular intervals.

In addition, the position detecting device 200 is provided with a selection circuit 206 to which the X-axis direction loop coil group 204a and the Y-axis direction loop coil group 204b are connected. The selection circuit 206 sequentially selects one loop coil from among the two loop coil groups 204a and 204b.

Further, the position detecting device 200 is provided with an oscillator 203, a current driver 205, a change-over connection circuit 207, a reception amplifier 208, a detector 209, a low-pass filter 210, a sample and hold circuit 212, an A/D (Analog to Digital) conversion circuit 213, a synchronous detector 216, a low-pass filter 217, a sample and hold circuit 218, an A/D conversion circuit 219 and a processing circuit 214 (e.g., microprocessor).

The oscillator 203 is an oscillator which generates an AC (Alternating Current) signal of a frequency f0, and supplies it to the current driver 205 and the synchronous detector 216. The current driver 205 converts the AC signal supplied from the oscillator 203 into a current, and outputs the current to the change-over connection circuit 207. Under control by the processing circuit 214 which will be described later, the change-over connection circuit 207 changes over the connection destination (a transmission-side terminal T, a reception-side terminal S) to which the loop coil selected by the selection circuit 206 is to be connected. Of the connection destinations, the transmission-side terminal T is connected with the current driver 205, whereas the reception-side terminal R is connected with the reception amplifier 208.

An induced voltage generated in the loop coil selected by the selection circuit 206 is sent through the selection circuit 206 and the change-over connection circuit 207 to the reception amplifier 208. The reception amplifier 208 amplifies the induced voltage supplied from the loop coil, and outputs the amplified voltage to the detector 209 and the synchronous detector 216.

The detector 209 detects the induced voltage generated in the loop coil, that is, the received signal, and outputs the detected signal to the low-pass filter 210. The low-pass filter 210 has a cutoff frequency sufficiently lower than the above-mentioned frequency f0, converts the output signal from the detector 209 into a DC (Direct Current) signal, and outputs it to the sample and hold circuit 212. The sample and hold circuit 212 holds a voltage value at a predetermined signal, specifically, at a predetermined signal during a reception period, of the output signal from the low-pass filter 210, and outputs the voltage value to the A/D conversion circuit 213. The A/D conversion circuit 213 converts the analog output from the sample and hold circuit 212 into a digital signal, and outputs it to the processing circuit 214.

On the other hand, the synchronous detector 216 performs synchronous detection of the output signal from the reception amplifier 208 with the AC signal from the oscillator 203, and outputs a signal at a level according to the phase difference between them to the low-pass filter 217. The low-pass filter 217 has a cutoff frequency sufficiently lower than the frequency f0, converts the output signal from the synchronous detector 216 into a DC signal, and outputs it to the sample and hold circuit 218. The sample and hold circuit 218 holds a voltage value at a predetermined timing of the output signal from the low-pass filter 217, and outputs the voltage value to the A/D conversion circuit 219. The A/D conversion circuit 219 converts the analog output from the sample and hold circuit 218 into a digital signal, and outputs it to the processing circuit 214.

The processing circuit 214 controls each part of the position detecting device 200. Specifically, the processing circuit 214 controls the selection of the loop coil in the selection circuit 206, the change-over in the change-over connection circuit 207, and the timings in the sample and hold circuits 212 and 218. Based on the input signals from the A/D conversion circuits 213 and 219, the processing circuit 214 causes electromagnetic waves to be transmitted from the X-axis direction loop coil group 204a and the Y-axis direction loop coil group 204b with a predetermined transmission continuation time.

In each of the loop coils in the X-axis direction loop coil group 204a and the Y-axis direction loop coil group 204b, an induced voltage is generated by the electromagnetic wave transmitted from the electronic pen 10. The processing circuit 214 calculates coordinate values in the X-axis direction and the Y-axis direction of the indicated position indicated by the electronic pen 10, based on the level of the voltage value of the induced voltage generated in each loop coil. In addition, the processing circuit 214 detects the pen pressure, based on the phase difference between the transmitted electromagnetic wave and the received electromagnetic wave. In this way, the input device can be configured by the electronic pen 10 of the electromagnetic resonance system of the present embodiment and the position detecting device 200 of the electromagnetic resonance system depicted in FIG. 4.

[Cartridge Type Electronic Pen]

Figure 5A:
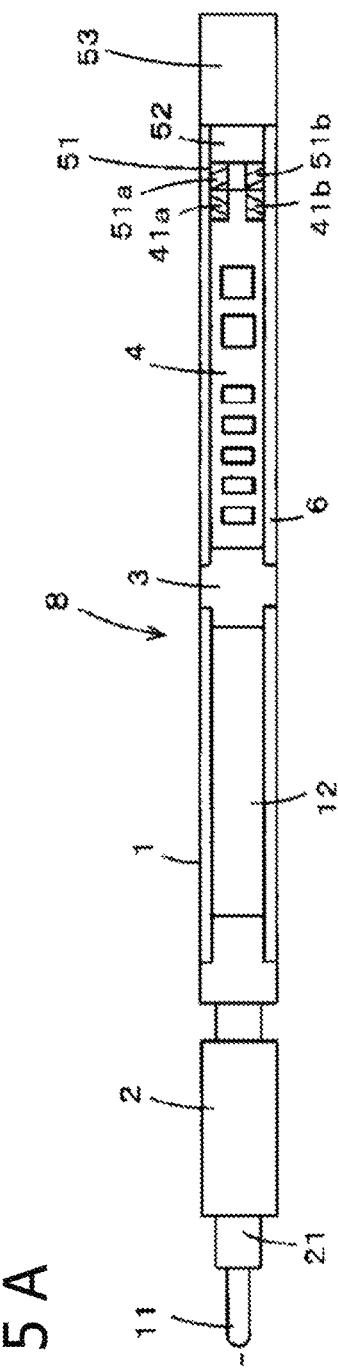
FIGS. 5A to 5C are figures for explaining an electronic pen cartridge configured by use of an electronic pen main body section of the embodiment.
Figure 5B:
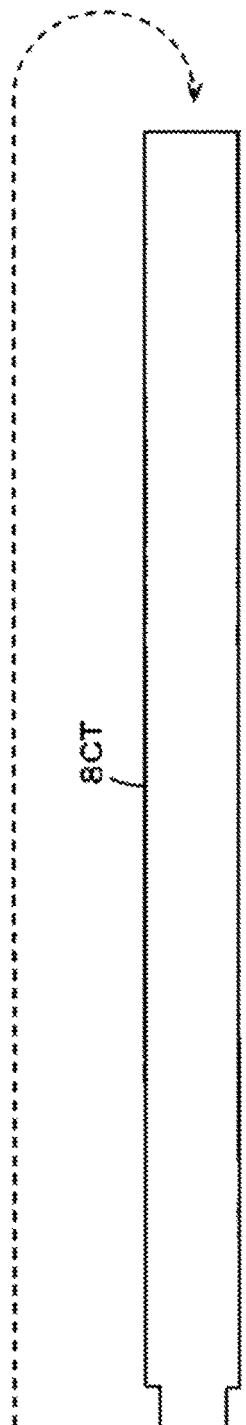
Figure 5C:
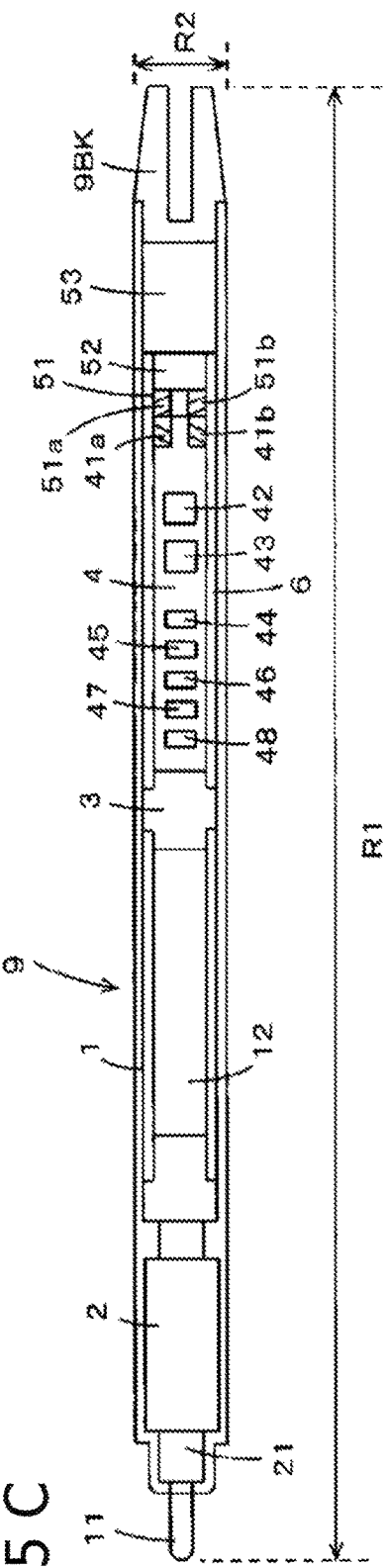

Utilizing the electronic pen main body section 8 in the present embodiment, an electronic pen cartridge of the same shape as that of a refill of a ball-point pen, for example, can be configured, and by mounting the electronic pen cartridge in a ball-point pen casing, for example, an electronic pen can be configured. FIGS. 5A to 5C are figures for explaining an electronic pen cartridge configured using the electronic pen main body section 8 of the present embodiment.

FIG. 5A depicts an electronic pen main body section 8 configured as described using FIGS. 1 to 3B. FIG. 5B depicts a tubular cartridge casing 8CT in which to accommodate the electronic pen main body section 8. The cartridge casing 8CT is provided, at its end (core body side end) on the left side in FIG. 5B, with a small opening sized such that a tip portion of the core body 11 of the electronic pen main body section 8 is protruded therethrough. In addition, the cartridge casing 8CT is provided, at its end (rear end side end) on the right side in FIG. 5B, with an opening through which to insert the electronic pen main body section 8.

As indicated by dotted line arrow in FIGS. 5A and 5B, the electronic pen main body section 8 is accommodated into the cartridge casing 8CT through the opening on the rear end side. FIG. 5C depicts an external appearance of an electronic pen cartridge 9 configured by accommodating the electronic pen main body section 8 in the cartridge casing 8CT. Note that FIG. 5C depicts a case in which the cartridge casing 8CT is formed from a transparent synthetic resin, so that the inside thereof can be visually observed.

In the case of this example, as depicted in FIG. 5C, only a tip portion of the core body 11 of the electronic pen main body section 8 is protruded from the opening at the core body side end of the cartridge casing 8CT, and the other portion of the electronic pen main body section 8 is located inside the cartridge casing 8CT. In addition, the opening at the rear end side end of the cartridge casing 8CT is closed by fitting a cartridge casing cap 8BK thereto. The cartridge casing cap 8BK in this example is provided with a recess for fitting to the inside of a ball-point pen casing similarly to a refill of a ball-point pen, as depicted in FIG. 5C.

Note that in this example, the cartridge casing cap 8BK is provided, at its surface facing the pressure sensor 53, with a projection to be fitted into the recess of the holding member 53c provided inside the pressure sensor 53 as the casing cap 102 depicted in FIGS. 2B and 3B. By this, the portion composed of the holding member 53c and the conductive member 53d is positionally restricted within the resin mold 53x, such as to be able to face the dielectric 53a at a fixed position.

Besides, as depicted in FIG. 5C, of the electronic pen cartridge 9 in this example, the length R1 in the longitudinal direction and the width R2 in a direction orthogonal to the longitudinal direction are equal to the length and width of a refill of a ball-point pen in which the electronic pen cartridge 9 is to be mounted.

Consequently, when the electronic pen cartridge 9 in this example formed by accommodating the electronic pen main body section 8 in the cartridge casing 8CT is mounted in a casing of a predetermined ball-point pen, an electronic pen to be used by a user can be configured. In other words, an electronic pen can be configured by a casing of an existing ball-point pen and the electronic pen cartridge 9. As a result, while utilizing a casing of a ball-point pen with which the user is familiar, an electronic pen convenient to use can be easily configured.

In addition, in the case where the electronic pen cartridge 9 is formed as has been described using FIGS. 5A to 5C, this can be utilized as a substitute for a refill to be mounted in a casing of a multicolor ball-point pen. FIGS. 6A and 6B are figures for explaining an example in which an electronic pen cartridge is utilized in a casing of a multicolor ball-point pen.

FIG. 6A is a configuration view depicting an external appearance of an electronic pen 10X in this example. In the example of FIG. 6A, also, a casing 101M of the electronic pen 10X is formed from a transparent synthetic resin, so that the inside thereof is seen through.

The casing 101M of the electronic pen 10X has the same configuration as that of a casing and a knock cam mechanism of a commercialized knock-type multicolor ball-point pen. The casing and the knock cam mechanism of a commercialized knock-type multicolor ball-point pen may be used as they are. In this example, three electronic pen cartridges 9B, 9R and 9E are accommodated in the casing 101M.

The casing 101M is formed with an opening 101Ma on one end side in regard of the axial direction, such that when one of the electronic pen cartridges 9B, 9R and 9E is moved sliding in the axial direction by a knock mechanism, a tip portion of a core body 11 of the one electronic pen cartridge is protrude to the exterior through the opening 101Ma.

In a state in which the electronic pen cartridges 9B, 9R and 9E should not be moved sliding in the axial direction by the knock mechanism, the whole bodies of them inclusive of tips of their core bodies 11 are accommodated in the hollow portion of the casing 101M, thereby being protected, as depicted in FIG. 6A. Then, the tip of the core body 11 of the one of the electronic pen cartridges 9B, 9R and 9E which is moved sliding in the axial direction by the knock mechanism is protruded to the outside through the opening 101Ma, as aforementioned. Therefore, the electronic pen cartridge moved by the knock mechanism such that the tip of the core body 11 thereof is protruded to the outside through the opening 101Ma is released from the protection.

The electronic pen cartridges 9B, 9R and 9E are configured in the same manner, on an external shape basis, as the electronic pen cartridge 9 described using FIGS. 5A to 5C above, except that they have the same size as a refill of a multicolor ball-point pen. It is to be noted, however, that in the electronic pen cartridges 9B, 9R and 9E in this example, as will be described later, cartridge casings 91B, 91R and 91E (corresponding to the cartridge casing 8CT depicted in FIG. 5B) are each provided with a switch member which is turned ON/OFF according to the axial movement by the knock mechanism.

In the electronic pen 10X in this example, whether or not the electronic pen cartridges 9B, 9R and 9E are in a protected state in the electronic pen 10X by the knock mechanism is detected according to the states of the switches provided in the electronic pen cartridges 9B, 9R and 9E, as will be described later. In other points of configuration, the electronic pen cartridges 9B, 9R and 9E are the same as the electronic pen cartridge 9 described using FIGS. 1 to 3B and FIGS. 5A to 5C above.

The knock mechanism of the electronic pen 10X includes: knock rods 19B, 19R and 19E provided with fitting portions 19Ba, 19Ra and 19Ea to which the electronic pen cartridges 9B, 9R and 9E are fitted respectively; a spring receiving member 17; and coil springs 18B, 18R and 18E disposed between the fitting portions 19Ba, 19Ra and 19Ea for the electronic pen cartridges 9B, 9R and 9E and the spring receiving member 17.

The spring receiving member 17 is mounted in the state of being fixed at a predetermined position in the axial direction in the hollow portion of the casing 101M. The spring receiving member 17 is formed therein with through-holes 17B, 17R and 17E through which the cartridge casings 91B, 91R and 91E of the electronic pen cartridges 9B, 9R and 9E are respectively inserted and passed. The electronic pen cartridges 9B, 9R and 9E are inserted and passed through the through-holes 17B, 17R and 17E in the spring receiving member 17 and through the coil springs 18B, 18R and 18E, and are fitted to the fitting portions 19Ba, 19Ra and 19Ea of the knock rods 19B, 19R and 19E, thereby being mounted to the electronic pen 10X.

The casing 101M, in which the knock rods 19B, 19R and 19E are accommodated, is provided with through-slits (omitted from illustration in FIG. 6A) through which the knock rods 19B, 19R and 19E are partly exposed to the exterior and in which the knock rods 19B, 19R and 19E can be moved in the axial direction.

In the electronic pen 10X, like in the case of a known multicolor ball-point pen, when one of the knock rods 19B, 19R and 19E is slid toward the opening 101Ma side and the tip of the core body 11 of the one of the electronic pen cartridges 9B, 9R and 9E which is fitted to the one knock rod is put into a state of protruding to the exterior through the opening 101Ma, a locking portion (omitted from illustration) of the knock rod 19B, 19R, or 19E is engaged with an engaging portion formed in the hollow portion of the casing 101M, resulting in a locked state in which the just-mentioned state is locked.

Then, when another knock rod is moved sliding toward the opening 101Ma side in the locked state, the locking of the knock rod being in the locked state is released, and the knock rod is returned into its original state depicted in FIG. 6A by one of the coil springs 18B, 18R and 18E. Then, the knock rod moved sliding later can be locked in a state in which the tip of the core body 11 of one of the electronic pen cartridges 9B, 9R and 9E which is fitted to the knock rod is protruded to the exterior through the opening 101Ma.

Thereafter, similarly, by sliding movements of the knock rods, the electronic pen cartridge relevant to the protrusion of the tip of the core body 11 through the opening 101Ma can be changed over. When the sliding movement of one of the knock rods 19B, 19R and 19E is stopped in the course of obtaining a locked state, the locking of another knock rod being locked is released, and that knock rod is returned into the protected state depicted in FIG. 6A by one of the coil springs 18B, 18R and 18E.

FIGS. 6B and 6C are figures for explaining a switch provided for each of the electronic pen cartridges 9B, 9R and 9E. FIGS. 6B and 6C depict the switch which is provided for the electronic pen cartridge 9B, and the switches provided for the other electronic pen cartridges 9R and 9E are also configured in the same manner.

Specifically, a through-hole 91Ba is provided in a circumferential surface of that part of the cartridge casing 91B which is accommodated in the through-hole 17B in the spring receiving member 17 just when the electronic pen cartridge 9B is fitted to the fitting portion 19Ba of the knock rod 19B being in a non-locked state, and the switch member 50B is provided in the cartridge casing 91B in such a manner as to be partly exposed through the through-hole 91Ba in this instance.

The switch member 50B is formed from a material which is elastic and is conductive, for example, an elastic conductive metal. As depicted in FIGS. 6B and 6C, the switch member 50B includes a fixed terminal piece B1 fixed to an inner wall surface in the vicinity of the through-hole 91Ba of the cartridge casing 91B, and a movable terminal piece B2 capable of making elastic contact with the fixed terminal piece B1. The movable terminal piece B2 has a bent portion B2a configured to be able to assume a state of elastic contact with the fixed terminal piece B1 and a state of non-contact with the fixed terminal piece B1, and the movable terminal piece B2 is mounted in the cartridge casing 91B in such a manner that the bent portion B2a can be partly protruded through the through-hole 91Ba.

When the electronic pen cartridge 9B is fitted to the fitting portion 19Ba of the knock rod 19B being in a non-locked state and the electronic pen cartridge 9B is in a protected state in which its whole body is present in the hollow portion of the casing 101M, the switch member 50B is just located in the through-hole 17B of the spring receiving member 17, as depicted in FIG. 6B. Therefore, the bent portion B2a of the movable terminal piece B2 is elastically displaced to the inside of the cartridge casing 91B by the inner wall of the through-hole 17B, so that the fixed terminal piece B1 and the movable terminal piece B2 come into a state of being spaced from each other without making contact. In other words, the switch member 50B comes into an OFF state.

When the knock rod 19B is moved sliding into a locked state and the electronic pen cartridge 9B is in a non-protected state in which the tip of the core body 11 thereof is protruded through the opening 101Ma of the casing 101M, the switch member 50B is in a state of being released from the through-hole 17B of the spring receiving member 17, as depicted in FIG. 6C. In this instance, a part of the bent portion B2a of the movable terminal piece B2 is elastically displaced such as to protrude through the through-hole 91Ba, whereby the movable terminal piece B2 and the fixed terminal piece B1 are brought into a state of contacting each other. In other words, the switch member 50B comes into an ON state.

The fixed terminal piece B1 and the movable terminal piece B2 of the switch member 50B are electrically connected to an IC 42 on the circuit board 4 accommodated in the cartridge casing 91B. The IC 42 has a function as a control circuit; by monitoring the ON/OFF state of the switch member 50B, the IC 42 detects whether the electronic pen cartridge 9B is in a protected state in which its whole body is present in the hollow portion of the casing 101M, or the electronic pen cartridge 9B is in a non-protected state in which the tip of the core body 11 thereof is protruded through the opening 101Ma of the casing 101M by the knock rod 19B.

Also in the electronic pen cartridges 9R and 9E, similarly, switch members 50R and 50E (omitted from illustration) are provided in the cartridge casings 91R and 91E, and are each connected to the IC 42 of the circuit board 4 accommodated in the cartridge casing 91R or 91E. In the case of this example, when one of the switch members 50B, 50R and 50E of the electronic pen cartridges 9B, 9R and 9E is put into an ON state and the relevant electronic pen cartridge is in a non-protected state, the connection between the electronic parts mounted on the circuit board 4 is turned ON, whereby a relevant function is accomplished. As a result, transfer of signals between the electronic pen and the position detecting device side is enabled.

Besides, in the case of the present embodiment, the position detecting device used together with the electronic pen cartridges 9B, 9R and 9E has a function of receiving ID (Identification) data transmitted from each of the electronic pen cartridges 9B, 9R and 9E for distinguishing them. Specifically, the position detecting device in the present embodiment distinguishes the differences among the electronic pen cartridges 9B, 9R and 9E, and realizes the functions assigned to each of the electronic pen cartridges 9B, 9R and 9E.

For example, the electronic pen cartridge 9B is assigned a function of displaying calligraphy (characters or figures) according to the indicated position indicated thereby, in black, whereas the electronic pen cartridge 9R is assigned a function of displaying calligraphy according to the indicated position indicated thereby, in red, and the electronic pen cartridge 9E is assigned a function of erasing previously inputted calligraphy according to the indicated position indicated thereby.

For this reason, an ID memory for storing not only the ID data of the electronic pen cartridges 9B, 9R and 9E but also data for informing the character color and the data for informing the erasing function is mounted on each of the circuit boards 4 mounted in the respective electronic pen cartridges 9B, 9R and 9E. Besides, the ICs 42 on the circuit boards 4 mounted in the respective electronic pen cartridges 9B, 9R and 9E can transmit the data, when required, to the position detecting device.

Note that the functions to be assigned to the electronic pen cartridges are not limited to the colors in which to represent the calligraphy according to the indicated position as in this example, but may be the thickness of the calligraphy or the kinds of lines to be displayed, such as a solid line, a dotted line, and an alternate long and short dash line.

[Application to Electronic Pen of Capacitive Coupling System]

Figure 7:
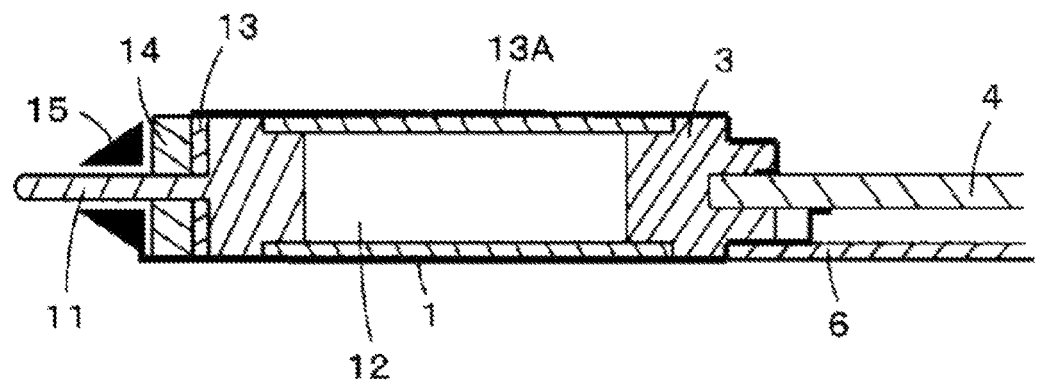
FIG. 7 is a sectional view for explaining an example in which the present disclosure is applied to an electronic pen main body section of a capacitive coupling system.

While the electronic pen main body section 8 in the above-described embodiment has been of the electromagnetic resonance system, the present disclosure is applicable also to the case where an electronic pen main body section of a capacitive coupling system is configured. FIG. 7 is a sectional view for explaining an example of application of the present disclosure to an electronic pen main body section of the capacitive coupling system, and depicts the connection state of component members of a part including an ink writing section 1 as a center.

As depicted in FIG. 7, an electronic pen main body section 8A in this example has a configuration in which a terminal member 13 and a conductive member 14 are provided around a core body 11 of an ink writing section 1. In this example, the core body 11 is formed from a conductive material such as a metal. The terminal member 13 is an annular terminal provided around the core body 11, and is formed from a conductive material such as a metal, for example. The terminal member 13 is connected with a connection wire 13A, which extends to a circuit board 4 and is connected to an electronic circuit on the circuit board 4. Further, a shield 15 is disposed such as to cover the periphery of the core body 11.

The conductive member 14 is formed from, for example, a conductive rubber or a conductive resin or the like, and is provided with a through-hole having a diameter smaller than the outside diameter of the core body 11; with the core body 11 made to penetrate the through-hole, the terminal member 13 and the core body 11 are electrically connected in a reliable manner. Note that the conductive member 14 and the ink writing section 1 clamp the terminal member 13 therebetween, such as to prevent the terminal member 13 from moving.

By this, a transmission signal from the electronic circuit formed on the circuit board 4 is supplied to the terminal member 13 through the connection wire 13A. The transmission signal supplied to the terminal member 13 is supplied to the core body 11 through the conductive member 14 interconnecting the terminal member 13 and the core body 11. The core body 11 transmits the transmission signal, supplied thereto, to a position detecting device. In this way, an electronic pen of a so-called active capacitive system can be realized.

Thus, the electronic pen main body section 8A depicted in FIG. 7 differs from the above-described electronic pen main body section 8 in that the terminal member 13 which is connected to the electronic circuit on the circuit board and the conductive member 14 which electrically interconnects the terminal member 13 and the core body 11 of the ink writing section 1 are provided in the periphery of the core body 11. In other points of configuration, the electronic pen main body section 8A is the same as the aforementioned electronic pen main body section 8.

[Outline of Position Detecting Device of Capacitive Coupling System]

Figure 8:
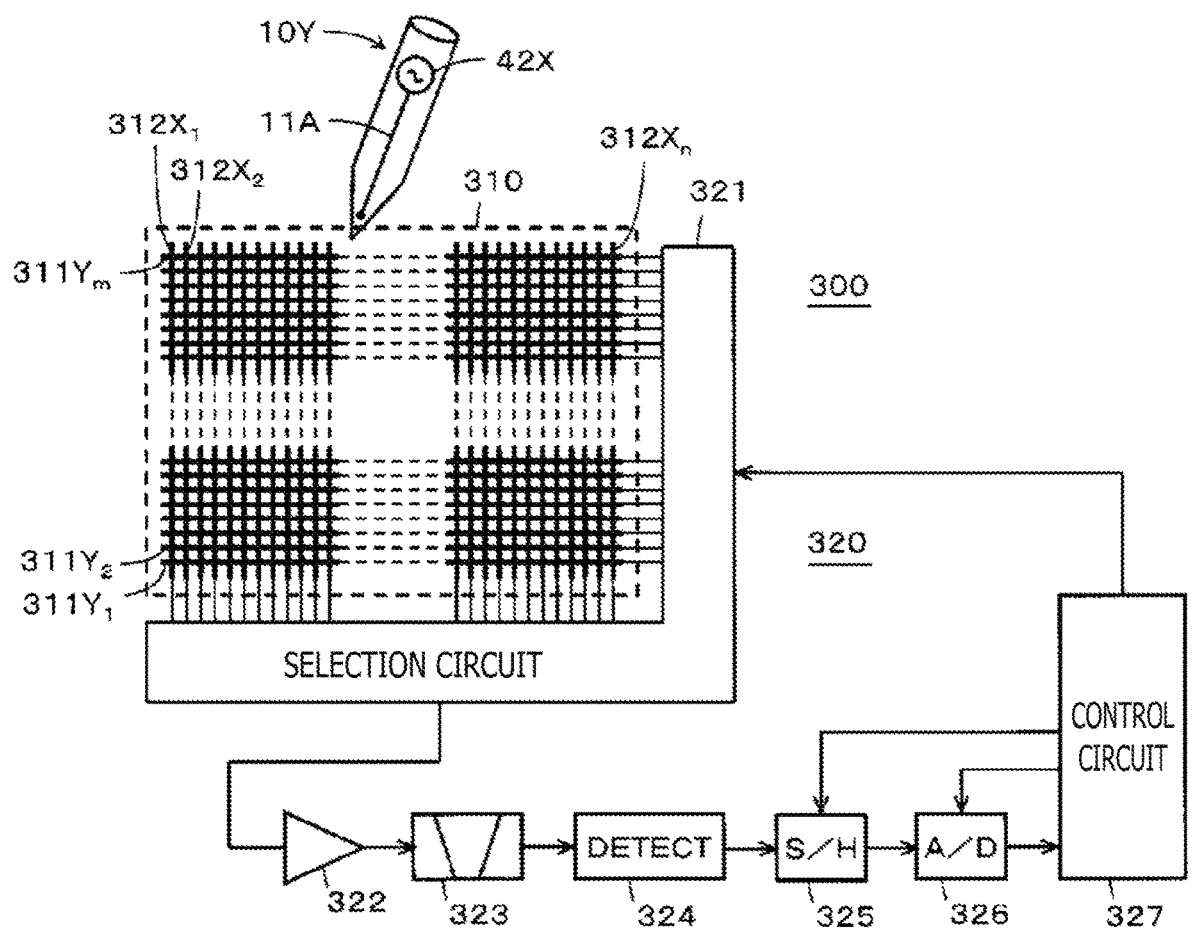
FIG. 8 is a bock diagram for explaining a position detecting device in which a coordinate detection sensor of a capacitive coupling system is used.

FIG. 8 is a block diagram for explaining a position detecting device 300 in which is used a coordinate detection sensor of a capacitive coupling system which receives a signal from an electronic pen 10Y configured using the electronic pen main body section 8A depicted in FIG. 7, detects the position on the sensor, and detects a pen pressure and the state of a side switch.

As illustrated in FIG. 8, the position detecting device 300 in this example includes a coordinate detection sensor (hereinafter referred to simply as sensor) 310 of the capacitive coupling system and a pen detection circuit 320 connected to the sensor 310. Though not illustrated, the sensor 310 in this example includes a first conductor group 311, an insulating layer (omitted from illustration), and a second conductor group 312 which are stacked sequentially in this order from the lower side. The first conductor group 311 has, for example, a plurality of first conductors 311Y1, 311Y2, 311Ym (m is a positive integer) which extend in a horizontal direction (X-axis direction) and are disposed juxtaposedly at a predetermined interval in a Y-axis direction. In addition, the second conductor group 312 has, for example, a plurality of second conductors 312X1, 312X2, 312Xn (n is a positive integer) which extend in a vertical direction (Y-axis direction) orthogonal to the first conductor group 311 and are disposed juxtaposedly at a predetermined interval in the X-axis direction.

Thus, the sensor 310 of the position detecting device 300 has a configuration in which the position indicated by an electronic pen is detected by use of a sensor pattern formed by making the first conductor group 311 and the second conductor group 312 intersect each other. Note that in the following description, when it is unnecessary to distinguish the first conductors 311Y1, 311Y2, 311Ym from one another, they will be referred to as the first conductors 311Y. Similarly, when it is unnecessary to distinguish the second conductors 312X1, 312X2, 312Xn from one another, they will be referred to as the second conductors 312X.

The pen detection circuit 320 includes a selection circuit 321 used as an input/output interface for the sensor 310, an amplification circuit 322, a band-pass filter 323, a detection circuit 324, a sample and hold circuit 325, an A/D conversion circuit 326 and a control circuit 327 (e.g., microprocessor).

The selection circuit 321 selects one conductor 311Y or 312X from among the first conductor group 311 and the second conductor group 312, based on a control signal from the control circuit 327. The conductor selected by the selection circuit 321 is connected to the amplification circuit 322, a signal from the electronic pen 10Y is detected by the selected conductor, and is amplified by the amplification circuit 322. An output from the amplification circuit 322 is supplied to the band-pass filter 323, where only a frequency component of the signal transmitted from the electronic pen 10Y is extracted.

An output signal from the band-pass filter 323 is detected by the detection circuit 324. An output signal from the detection circuit 324 is supplied to the sample and hold circuit 325, where it is sample-held at a predetermined timing according to a sampling signal from the control circuit 327, before being converted into a digital value by the A/D conversion circuit 326. Digital data from the A/D conversion circuit 326 is read, and is processed, by the control circuit 327.

The control circuit 327 operates to output control signals to the sample and hold circuit 325, the A/D conversion circuit 326 and the selection circuit 321, according to a program stored in a ROM (Read Only Memory) provided therein. Then, the control circuit 327 calculates the coordinates of a position on a sensor 110 which is indicated by the electronic pen 10Y, from the digital data received from the A/D conversion circuit 326. Further, the control circuit 327 detects a pen pressure detected by the pen pressure detector 5 composed of pressure sensing parts and the like of the electronic pen 10Y, and the state of the side switch 43 of the electronic pen 10Y.

Note that in the electronic pen 10Y in this example, a signal generation circuit 42X of the IC 42 on the circuit board 4 is composed only of an oscillation circuit, and the pen pressure and the ON/OFF of the side switch are transmitted as variations in the oscillation frequency to the position detecting device. However, this is not restrictive. A configuration may be adopted in which the signal generation circuit includes an oscillation circuit and a circuit for applying a predetermined modulation to the oscillated signal, and pen pressure information and information indicative of the ON/OFF of the side switch are transmitted to the position detecting device as an ASK (Amplitude Shift Keying) signal, for example.

[Modification of Board Protecting Pipe]

Note that in the board protecting pipe 6 of the electronic pen main body section 8 in the above embodiment, as described using FIG. 2B, the opening 63 formed in the manner of cutting away a part of the side wall of the board protecting pipe 6 has been provided such as to interconnect the openings at the ends in regard of the axial direction (the openings in the direction intersecting the axial direction). The opening 63 is a side opening in the direction along the axial direction, and can be called a window or cutout provided in the side surface of the board protecting pipe 6. However, this is not limitative.

Figure 9A:
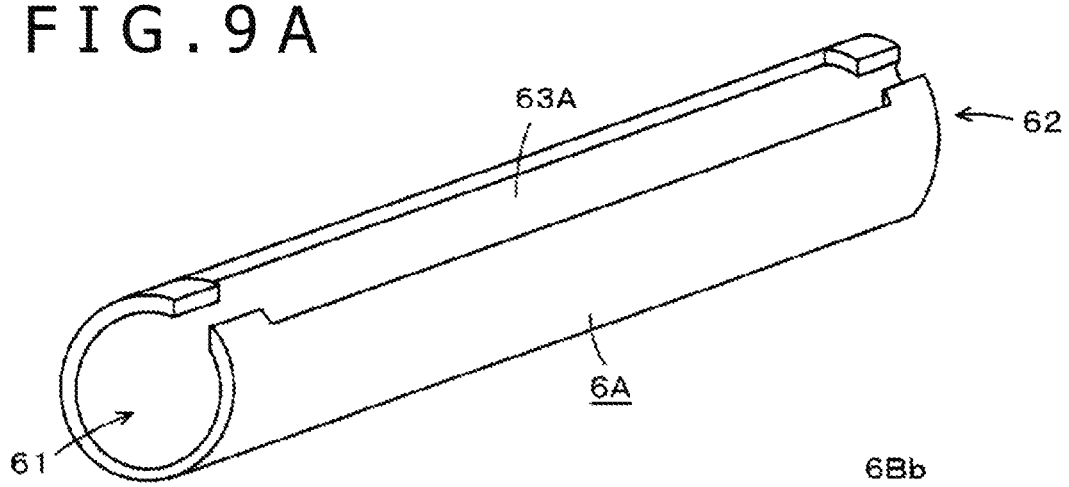
FIGS. 9A to 9C are figures for explaining modifications of a board protecting pipe.
Figure 9B:
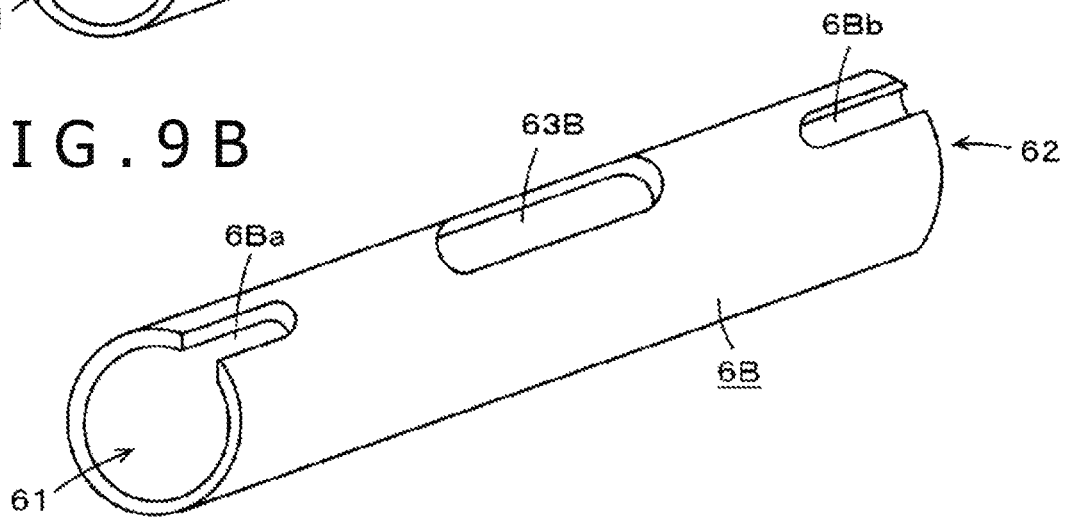
Figure 9C:
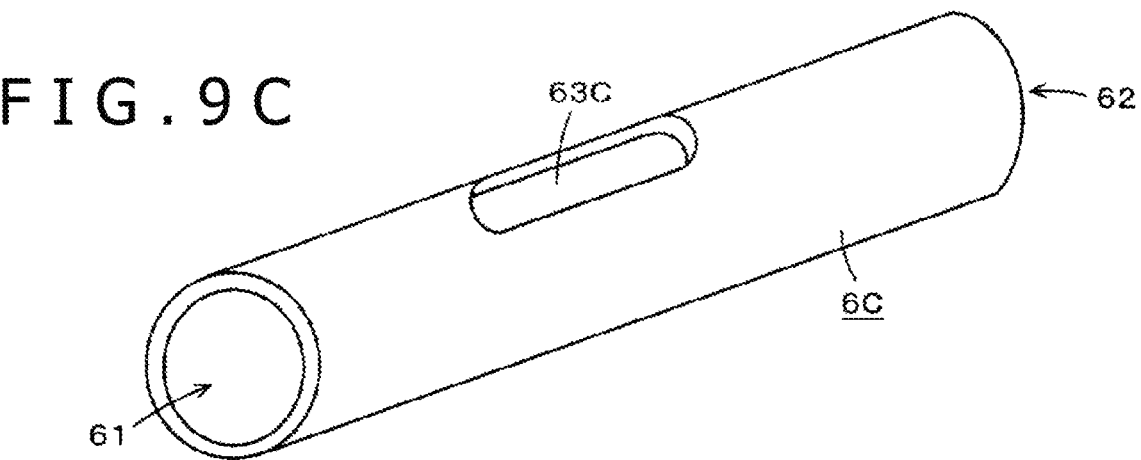
Figure 10:
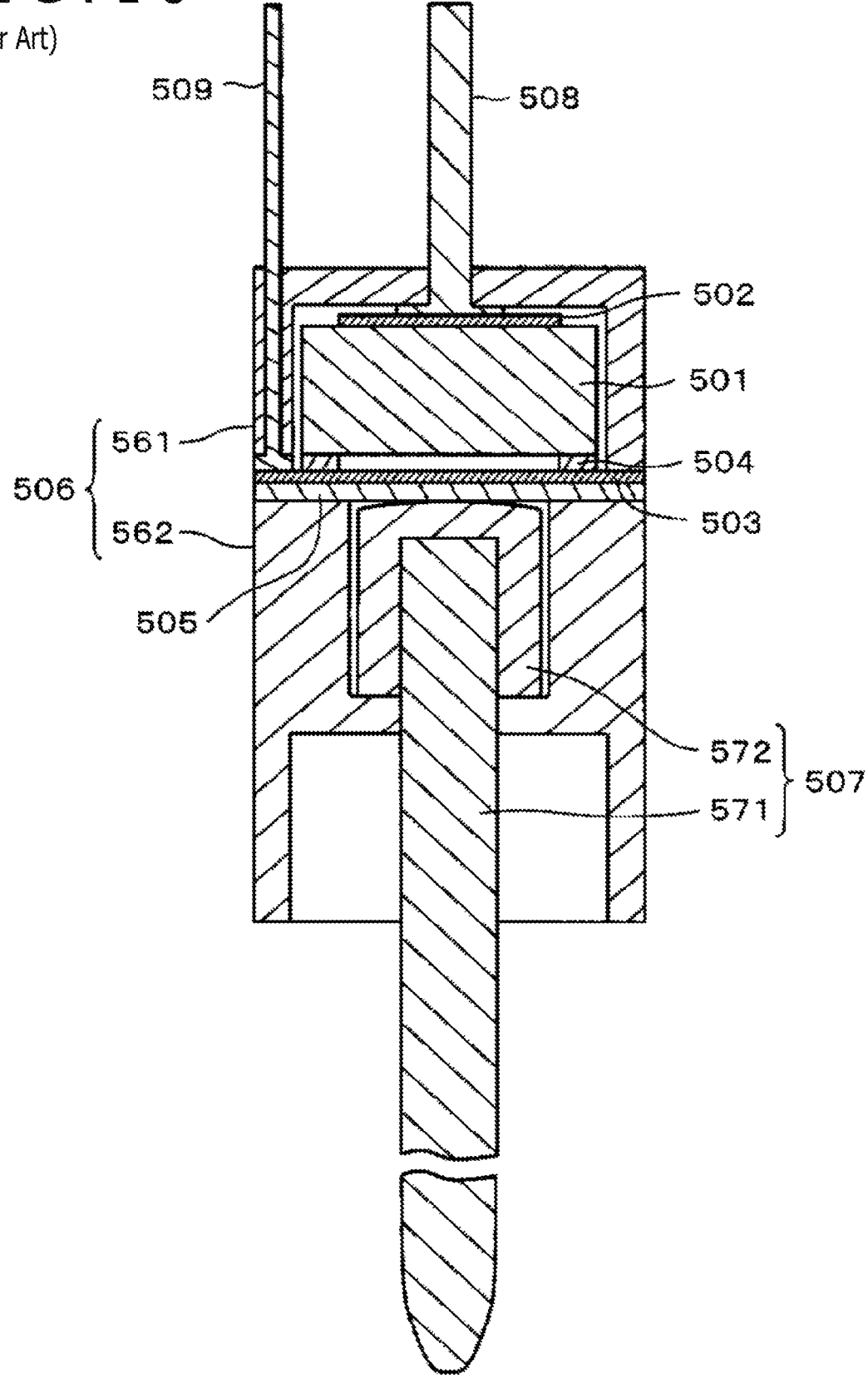
FIG. 10 is a figure depicting a configuration example of a core body and a pen pressure detector of a conventional electronic pen.

FIGS. 9A to 9C are figures for explaining modifications of the board protecting pipe 6. For instance, a board protecting pipe 6A in Modification 1 depicted in FIG. 9A has an opening 63A formed in the manner of cutting away a part of a side wall of the board protecting pipe 6 such as to interconnect a core body side opening 61 and a rear end side opening 62. However, as depicted in FIG. 9A, the parts of the core body side opening 61 and the rear end side opening 62 may be provided with parts where the width of the opening is narrowed. By this configuration, the fitting to the second holding section 32 of the connection member 3 and the fitting to the fitting section 52 of the pen pressure detector 5 can be made firmer.

In addition, a board protecting pipe 6B in Modification 2 depicted in FIG. 9B has a required minimum opening 63B provided at such a position that an operation on the side switch 43 on the circuit board 4 and a work on the electronic circuit formed on the circuit board 4 can be carried out through the opening 63B. This opening 63 is a so-called window which has an opening range as a closed range surrounded by the side surface of the board protecting pipe 6B. In addition, the parts of the core body side opening 61 and the rear end side opening 62 are provided with cutouts 6Ba and 6Bb as openings which have opening ranges as open ranges having parts not surrounded by the side surface of the board protecting pipe 6B. These cutouts 6Ba and 6Bb are for ensuring that the fitting to the second holding section 32 of the connection member 3 and the fitting to the fitting section 52 of the pen pressure detector 5 can be carried out easily and without lowering the extent of fitting.

In the case of Modification 2 depicted in FIG. 9B, the parts of the opening 63B and the cutouts 6Ba and 6Bb are narrower than the opening 63 of the board protecting pipe 6 depicted in FIG. 2B and the opening 63A of the board protecting pipe 6A depicted in FIG. 9A. Therefore, a higher strength of the board protecting pipe 6B is ensured and the circuit board 4 can be thereby protected more firmly, as compared to the cases of the board protecting pipe 6 depicted in FIG. 2B and the board protecting pipe 6A depicted in FIG. 9A.

Besides, a board protecting pipe 6C in Modification 3 depicted in FIG. 9C is of a type in which the cutouts 6Ba and 6Bb possessed by the board protecting pipe 6B of Modification 2 depicted in FIG. 9B are not provided but an opening 63C as a window is only provided. In the case of this board protecting pipe 6C, the strength of the board protecting pipe 6C itself can be enhanced, according to the absence of the cutouts 6Ba and 6Bb, as compared to the board protecting pipe 6B depicted in FIG. 9B.

In this way, the window or windows (the side opening or openings in the direction along the axial direction) provided in the board protecting pipe can be provided in a required number, at an appropriate position or positions of the board protecting pipe, in a required size or sizes, and in a required shape or shaped. It is to be noted, however, that a part where the side wall of the board protecting pipe 6 is present over an angular range of not less than 180 degrees with the axis as a center should be present, such that the circuit board accommodated in the board protecting pipe 6 can be held.

More preferably, a configuration is sufficient in which both the long sides of a surface, facing the side opening, of the circuit board accommodated in the board protecting pipe make contact with the inner wall of the board protecting pipe and do not come out to the exterior of the board protecting pipe. In other words, a configuration is sufficient in which the side opening provided in the board protecting pipe is smaller than that surface of the circuit board which faces the side opening. Note that a configuration in which there is no part where the angular range of the side wall of the board protecting pipe 6 is less than 180 degrees with the axis as a center is preferred, for maintaining the strength of the board protecting pipe 6.

[Others]

Note that the parts constituting the electronic pen main body section 8 or 8A can be of appropriate sizes, and an electronic pen main body section of an appropriate size can be configured. Therefore, the electronic pen cartridge 9 can also be configured in an appropriate size. Specifically, there are various standards for the refills of ball-point pens. Therefore, by configuring the electronic pen main body section 8 or 8A conforming to the desired standard and by using the cartridge casing 8CT conforming to the desired standard, an electronic pen cartridge 9 and the like confirming to the desired standard can be configured.

In addition, in the aforementioned embodiment, an ink writing section 1 having a core body 11 formed of a conductor such as a metal, with a tip portion provided with a ball-point pen mechanism may be considered. However, this is not limitative. For example, an ink writing section may be used which is configured as a so-called felt pen in which an ink is supplied from an ink holding section 12 to a conductive felt core body, thereby enabling writing. Thus, the ink writing section 1 includes various kinds of ones in which the core body 11 is conductive and is supplied with an ink from the ink holding section 12, to enable writing in the ink.

Besides, naturally, various electronic parts can be mounted on the circuit board 4, other than the above-mentioned electronic parts.

Note that while the pressure sensing parts of the pen pressure detector 5 have used the variable capacitor whose capacitance is variable by the mechanical moving part according to the pen pressure in the aforementioned embodiment, this is not restrictive. A part configured as a MEMS (Micro Electro Mechanical System) chip including a variable capacitor and a semiconductor device may also be used. In addition, naturally, the pressure sensing part may not be one for detecting variation in capacitance and may be one that is based on variation in inductance or resistance.

Besides, while the board protective pipe 6 has been assumed to be hollow cylindrical in shape in the aforementioned embodiment, this is not limitative. A tubular body having a side wall such as to be polygonal in section may be used as the board protecting pipe 6.

It is to be noted that the embodiment of the present disclosure is not limited to the foregoing embodiment, and that various changes can be made without departing from the spirit of the present disclosure.

What is claimed is:

1. An electronic pen comprising:
   an ink writing section including a core body and an ink holding section configured to hold an ink that is supplied to the core body;
   a circuit board;
   a transmission section which, in operation, transmits a signal;
   a connection member including a first side that holds an end portion of the ink writing section, on a side of the ink writing section opposite to the core body, the connection member also including a second side that holds a first end portion of the circuit board;
   a pen pressure detector provided adjacent to a second end portion of the circuit board; and
   a casing configured to accommodate the ink writing section, the connection member, the circuit board and the pen pressure detector, wherein a tip portion of the core body protrudes from the casing,
   wherein the transmission section is fixed to the core body,
   wherein the transmission section is disposed closer to the core body than the ink holding section,
   wherein the ink holding section is disposed between the transmission section and the circuit board, and
   wherein at least the ink writing section, the connection member and the circuit board move according to a pen pressure exerted on the core body.

2. The electronic pen according to claim 1,
   wherein at least the ink writing section, the connection member and the circuit board move according to the pen pressure exerted on the core body, and transmit the pen pressure to the pen pressure detector.

3. The electronic pen according to claim 1, further comprising:
   a rigid tubular member configured to accommodate the circuit board therein,
   wherein the rigid tubular member has a side opening that enables an operation to be conducted on the circuit board accommodated therein, and is fitted to the connection member at an end portion on one side of the tubular member in regard to an axial direction of the tubular member.

4. The electronic pen according to claim 1, wherein:
   the electronic pen is an electromagnetic induction system,
   the transmission section includes a coil provided around the core body,
   a resonance circuit is formed by connecting the coil and an electronic circuit including a capacitor formed on the circuit board, and
   the signal is transmitted to a position detecting device through the coil.

5. The electronic pen according to claim 1, wherein:
   the electronic pen is a capacitive system,
   the transmission section is integral with the core body,
   an electronic circuit having an oscillation circuit is configured on the circuit board,
   the electronic circuit and the core body are electrically connected, and
   the signal is from the oscillation circuit and is transmitted to a position detecting device through the core body.

6. The electronic pen according to claim 1,
   wherein the pen pressure detector is a variable capacitor having a capacitance that varies according to the pen pressure exerted on the core body.

7. The electronic pen according to claim 6,
   wherein the variable capacitor is configured as a micro electro mechanical system chip including a semiconductor device.

8. The electronic pen according to claim 1,
wherein the electronic pen is configured in a same shape as that of a refill that is accommodated in a ball-point pen casing.

9. The electronic pen according to claim 1,
wherein the electronic pen is configured in a same shape as that of a refill that is accommodated in a multifunctional pen casing.

\* \* \* \* \*